US006691091B1

(12) United States Patent
Cerisara et al.

(10) Patent No.: US 6,691,091 B1
(45) Date of Patent: Feb. 10, 2004

(54) METHOD FOR ADDITIVE AND CONVOLUTIONAL NOISE ADAPTATION IN AUTOMATIC SPEECH RECOGNITION USING TRANSFORMED MATRICES

(75) Inventors: Christophe Cerisara, Ars-sur-Moselle (FR); Luca Rigazio, Santa Barbara, CA (US); Robert Boman, Thousand Oaks, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 482 days.

(21) Appl. No.: 09/628,376

(22) Filed: Jul. 31, 2000

Related U.S. Application Data (63) Continuation-in-part of application No. 09/551,001, filed on Apr. 18, 2000, now Pat. No. 6,529,872.

(51) Int. Cl.[7] .............................................. G10L 15/06
(52) U.S. Cl. ...................................... 704/255; 704/244
(58) Field of Search ................................ 704/255, 246, 704/250, 251, 256, 275, 244

(56) References Cited

U.S. PATENT DOCUMENTS 6,026,359 A 2/2000 Yamaguchi et al.

OTHER PUBLICATIONS

S. Sagayama, Y. Yamaguchi and S. Takahashi, "Jacobian Adaptation of Noisy Speech Models," NTT Human Interface Laboratories, Musashino–shi, Tokyo 180 Japan.

Shigeki Sagayama, Yoshikazu Yamaguchi, Satoshi Takahashi, and Jun–ichi Takahashi, "Jacobian Approach to Fast Acoustic Model Adaptation," NTT Human Interface Laboratories, 1–1, Hikari–no–Oka, Yokosuka–shi, Kanagawa, 239 Japan.

M.J.F. Gales, "Predictive Model–Based Compensation Schemes for Robust Speech Recognition," Elsevier, Speech Communication 25 (1998) 49–74.

Pedro J. Moreno, Bhiksha Raj and Richard M. Stern, "A Vector Taylor Series Approach for Environment–Independent Speech Recognition," 1995 IEEE, pp. 733–736.

Cerisara et al.; "Environmental Adaptation Based on First Order Approximation"; Panasonic Speech Technology Laboratory; Santa Barbara, California.

Sagayama et al.; "Jacobian Approach to Fast Acoustic Model Adaptation"; NTT Human Interface Laboratories; IEEE, 1997; pp. 835–838.

Leggetter et al.; "Flexible Speaker Adaptation Using Maximum Likelihood Linear Regression"; Cambridge University Engineering Department; Cambridge, United Kingdom.

(List continued on next page.)

Primary Examiner—Daniel Abebe
(74) Attorney, Agent, or Firm—Harness, Dickey & Pierce, PLC (57) ABSTRACT

A noise adaptation system and method provide for noise adaptation in a speech recognition system. The method includes the steps of generating a reference model based on a training speech signal, and compensating the reference model for additive noise in the cepstral domain. The reference model is also compensated for convolutional noise in the cepstral domain. In one embodiment, the convolutional noise is compensated for by estimating a convolutional bias between the reference model and a target speech signal. The estimated convolutional bias is transformed with a channel adaptation matrix, and the transformed convolutional bias is added to the reference model in the cepstral domain.

13 Claims, 8 Drawing Sheets

OTHER PUBLICATIONS

M.J.F. Gales and S. J. Young, "Robust Speech Recognition in additive and Convolutional Noise Using Parallel Model Combination", Computer Speech and Language (1995) 9, 289–307.

Y.H. Chang, Y.J. Chung, S. U. Park, "Improved Model Parameter Compensation Methods for Noise–Robust Speech Recognition", Proceedings of the 1998 IEEE International Conference on Acoustics, Speech and Signal Processing.

M. Afify, Y. Gong, J.P. Haton, "A General Joint Additive adn Convolutive Bias Compensation Approach Applied to Noisy Lombard Speech Recognition", IEEE Transactions on Speech and Audio Processing, vol. 6, No. 6. Nov. 1998.

METHOD FOR ADDITIVE AND CONVOLUTIONAL NOISE ADAPTATION IN AUTOMATIC SPEECH RECOGNITION USING TRANSFORMED MATRICES

The following application is a continuation-in-part of U.S. patent application Ser. No.: 09/551,001 filed Apr. 18, 2000. U.S. Pat. No. 6,529,872

BACKGROUND AND SUMMARY OF THE INVENTION

The present invention relates generally to automatic speech recognition systems. More particularly, the invention relates to techniques for adapting the recognizer to perform better in the presence of noise.

Current automatic speech recognition systems perform reasonably well in laboratory conditions, but degrade rapidly when used in real world applications. One of the important factors influencing recognizer performance in real world applications is the presence of environmental noise that corrupts the speech signal. A number of methods, such as spectral subtraction or parallel model combination, have been developed to address the noise problem. However, these solutions are either too limited or too computationally expensive.

Recently, a Jacobian adaptation method has been proposed to deal with additive noise, where the noise changes from noise A to noise B. For example, U.S. Pat. No. 6,026,359 to Yamaguchi describes such a scheme for model adaptation in pattern recognition, based on storing Jacobian matrices of a Taylor expansion that expresses model parameters. However, for this method to perform well it is necessary to have noise A and noise B close to one another in terms of character and level. For example, the Jacobian adaptation technique is likely to work well where noise A is measured within the passenger compartment of a given vehicle travelling on a smooth road at 30 miles an hour, and where Noise B is of a similar character, such as the noise measured inside the same vehicle on the same road travelling at 45 miles per hour.

The known Jacobian adaptation technique begins to fail where noise A and B lie farther apart from one another, such as where noise A is measured inside the vehicle described above at 30 miles per hour and noise B is measured in the vehicle with windows down or at 60 miles per hour.

This shortcoming of the proposed Jacobian noise adaptation method limits its usefulness in many practical applications because it is often difficult to anticipate at training time the noise that may be present at testing time (when the system is in use). Also, improvements in Jacobian noise adaptation techniques are limited in many applications because the computational expense (processing time and/or memory requirements) needed makes them impractical.

The present invention addresses the foregoing shortcoming. Instead of using Jacobian matrices, the invention uses a transformed matrices which resembles the form of a Jacobian matrix but comprises different values. The transformed matrices compensate for the fact that the respective noises at training time and at recognition time may be far apart. The presently preferred embodiment of the inventive method effects a linear or non-linear transformation of the Jacobian matrices using an α-adaptation parameter to develop the transformed matrices. The transformation process can alternatively be effected through other linear or non-linear transformation means, such as using a neural network or other artificial intelligence mechanism. To speed computation, the resulting transformed matrices may be reduced through a dimensionality reduction technique such as principal component analysis.

Another concern relates to compensation of convolutional noise. Specifically, convolutional noise can be distinguished from the above discussed additive noise in that convolutional noise results from the speech channel. For example, changes in the distance from the speaker to the microphone, microphone imperfections, and even the telephone line over which the signal is transmitted all contribute to convolutional noise. Additive noise, on the other hand, typically results from the environment in which the speaker is speaking.

An important characteristic of convolutional noise is that it is multiplicative with the speech signal in the spectral domain, whereas additive noise is additive in the spectral domain. This causes particular difficulties with respect to noise compensation. In fact, most conventional approaches deal either with convolutional noise or additive noise, but not both.

The above advantages of α-Jacobian (and Jacobian) adaptation can be applied to joint compensation of additive and convolutional noise. The present invention provides a method and system for performing noise adaptation primarily in the cepstral domain. This is significant because convolutional noise is additive in this domain. The method includes the step of generating a reference model based on a training speech signal. The reference model is then compensated for both additive and convolutional noise in the cepstral domain.

One approach to compensating the reference model for convolutional noise includes the step of estimating a convolutional bias between the training speech signal and a target speech signal. The estimated convolutional bias is then transformed with a channel adaptation matrix. The method further provides for adding the transformed convolutional bias to the reference model in the cepstral domain. Thus, the present invention transforms and adapts the reference models as opposed to the signals themselves. In general, the compensation for additive and convolutional noise is done on the means of the Gaussian distributions.

In another aspect of the invention, a noise adaptation system for a speech recognition system has a reference model generator, an additive noise module and a convolutional noise module. The reference model generator generates a reference model based on a training speech signal. The additive noise module is coupled to the reference model generator and compensates the reference model for additive noise in the cepstral domain. The convolutional noise module is also coupled to the reference model generator and compensates the reference model for convolutional noise in the cepstral domain.

For a more complete understanding of the invention, its objects and advantages, refer to the following specification and to the accompanying drawings.

DESCRIPTION OF THE PREFERRED EMBODIMENT

Figure 1:
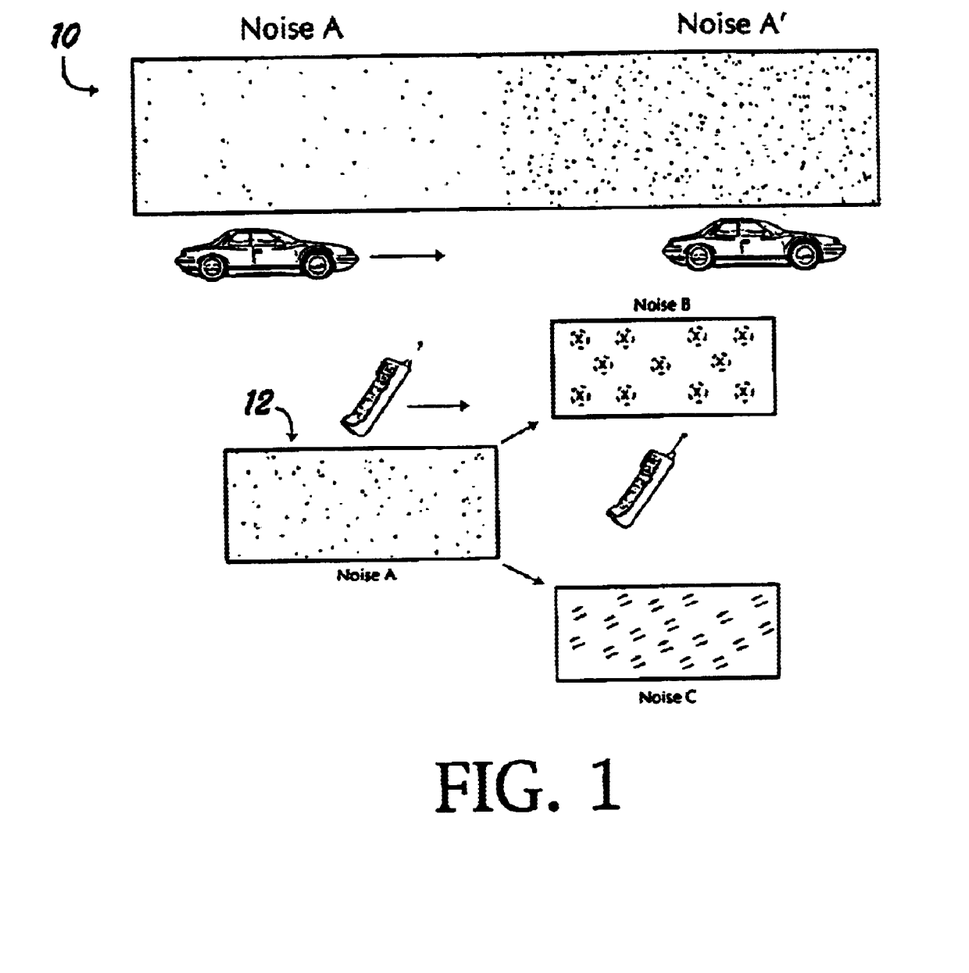
FIG. 1 diagrammatically represents different noise conditions, useful in understanding the invention.

FIG. 1 illustrates the problem that the present invention is designed to solve. As shown at 10, assume, for example, that the automatic speech recognition system must work in a noisy environment, such as within the passenger compartment of a moving vehicle. The noise level measured within the passenger compartment typically increases from noise A to noise A' as the vehicle speeds up. Although the noise level may increase from A to A', the character or quality of the noise remains largely the same. In a moving vehicle, for example, the noise spectrum typically changes in a predictable way as the vehicle speeds up. Wind noise increases in amplitude but retains its largely random white noise or pink noise character. Road surface noise (the sound of the tires rolling upon the road surface) increases in frequency in proportion to the increase in speed.

Unfortunately, in many real-world applications, the character and quality of the ambient noise cannot be as readily predicted as the conditions at 10 in FIG. 1 would imply. Consider the portable cellular telephone, for example. The cellular phone may be used inside a moving vehicle where it experiences the range of noises illustrated at 10; or it may be used on a street corner where completely different traffic sounds abound; or it may be used in a shopping mall with yet an entirely different noise quality. This wide diversity in different noise qualities is illustrated in FIG. 1 at 12, where three different noise patterns have been diagrammatically depicted as noise A, noise B and noise C. The unpredictability of noise quality has heretofore presented a significant challenge for automatic speech recognition systems that must perform in these varied noisy environments.

Figure 2:
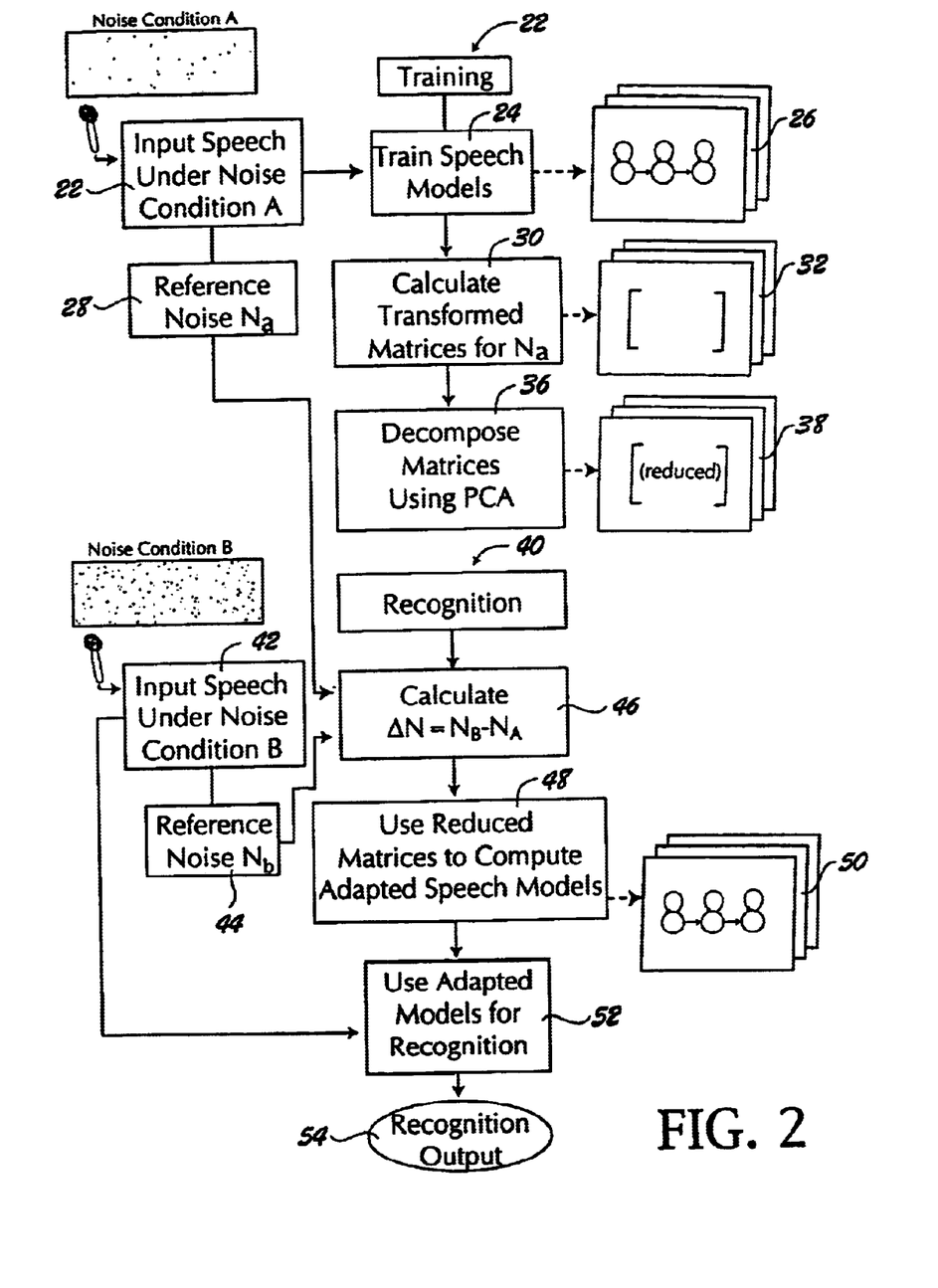
FIG. 2 is a data flow diagram of both training and recognition phases, illustrating a presently preferred implementation of the improved Transformed Matrix adaptation.

FIG. 2 illustrates an exemplary embodiment of the invention in a speech recognition application. The speech recognition application employs a model-based recognizer. The models are developed during training and are then later used during recognition. In FIG. 2, the training phase of the system is illustrated generally at 20 and the recognition phase at 40. Input speech is provided during the training phase under noise condition A, as illustrated at 22. The input speech is used to train speech models as indicated at step 24, with exemplary speech models diagrammatically represented at 26. In the typical input speech signal there will be times during which no speech is present, such as prior to the beginning of speech or after the end of speech. These non-speech portions may be used to record data indicative of the reference noise $N_a$ that is associated with noise condition A. In FIG. 2, the reference noise $N_a$ is stored at block 28. If desired, the noise may be modeled (background model) using the same training operation used to construct the speech models 26.

After training the speech models, a set of Transformed Matrices is calculated at step 30 and stored at 32. These matrices are used during recognition to adapt the speech models so that they will perform better under the noise conditions existing during recognition. The basic Jacobian adaptation process assumes that the quality of the noise during recognition time is approximately the same as during training time. Otherwise, classic Jacobian adaptation may produce less than optimal results.

The improved adaptation technique is based on the use of a set of Transformed Matrices generated for the initial noise condition $N_a$. The Transformed Matrices are computed by applying a linear or non-linear transformation to a set of the Jacobian matrices developed for the initial noise condition $N_a$. The presently preferred embodiments perform the transformation (both linear and non-linear) by applying an α-adaptation factor as presented in the next section. While the α-adaptation factor is presently preferred, a neural network or other artificial intelligence component may be used to effect the transformation.

The manipulation of matrices can be a highly computationally expensive process. A considerable cost factor is the memory space needed to store all of the matrices. In a typical embodiment, the speech models for each entry in the lexicon may employ multiple Hidden Markov Model states, with multiple Gaussian densities associated with each state. There would thus be one matrix for each of the Gaussians in each of the states. This could result in several hundred matrices needing to be stored.

The preferred embodiment performs a matrix decomposition step 36 to generate a reduced-complexity set of Jacobian matrices 38. As will be more fully discussed below, the presently preferred decomposition technique uses principal component analysis (PCA) to construct the reduced-complexity Transformed Matrices.

At recognition time, input speech from the user is provided at step 42. The input speech is associated with a noise condition B (also referred to as the target noise $N_b$) as illustrated at 44. As previously discussed, if the noise condition B is different in quality from the noise condition A used at training time, the traditional Jacobian adaptation technique may produce less than optimal results. However, we have found that the α-adaptation process (performed when the Jacobian matrices are defined during training) greatly improves recognition performance under adverse noise conditions. Results of our tests are provided in the example presented below.

The target noise $N_b$, shown at 44 in FIG. 2, is extracted from the input speech 42 and then used to calculate the difference from the reference noise $N_a$ as indicated at 46. New adapted speech models are then calculated using this noise difference and the reduced Transformed Matrices developed during training, as illustrated at 48. The resulting adapted speech models 50 are then used at 52 to perform speech recognition on the input speech 42 to provide the recognition output 54.

Alpha Adaptation

To better appreciate how our Transformed Matrices work, it is useful to understand conventional Jacobian adaptation. Conventional Jacobian adaptation is related to another form of adaptation known as parallel model combination (PMC). Traditionally, Jacobian adaptation is used as an approximation for PMC, in order to reduce the computational burden that PMC requires. PMC is highly computationally expensive because, for each density of the speech model, mean vectors must be transformed into the spectral domain. Then, after adding the mean vector to the target noise, the resulting vector must be transformed back into the cepstral domain.

This double transformation, which makes use of a matrix multiplication and of two non-linear functions, is usually too time consuming for embedded systems.

Traditionally, Jacobian adaptation is used as an approximation of PMC in the cepstral domain. For comparison purposes, Equation 1, reproduced below, describes the PMC calculation, where capital F represents the matrix of Discrete Cosign Transform (DCT). Equation 2 represents the traditional Jacobian adaptation calculation that is used as an approximation of the more computationally costly PMC calculation.

$$C(S+N) = F \cdot \log(\exp(F^{-1} \cdot C(S))) + \exp(F^{-1} \cdot C(N)) \quad \text{EQUATION 1}$$

$$\Delta C(S+N) = \frac{\partial C(S+N)}{\partial C(N)} \cdot \Delta C(N) = F \cdot \frac{N}{S+N} \cdot F^{-1} \cdot \Delta C(N) \quad \text{EQUATION 2}$$

Figure 3:
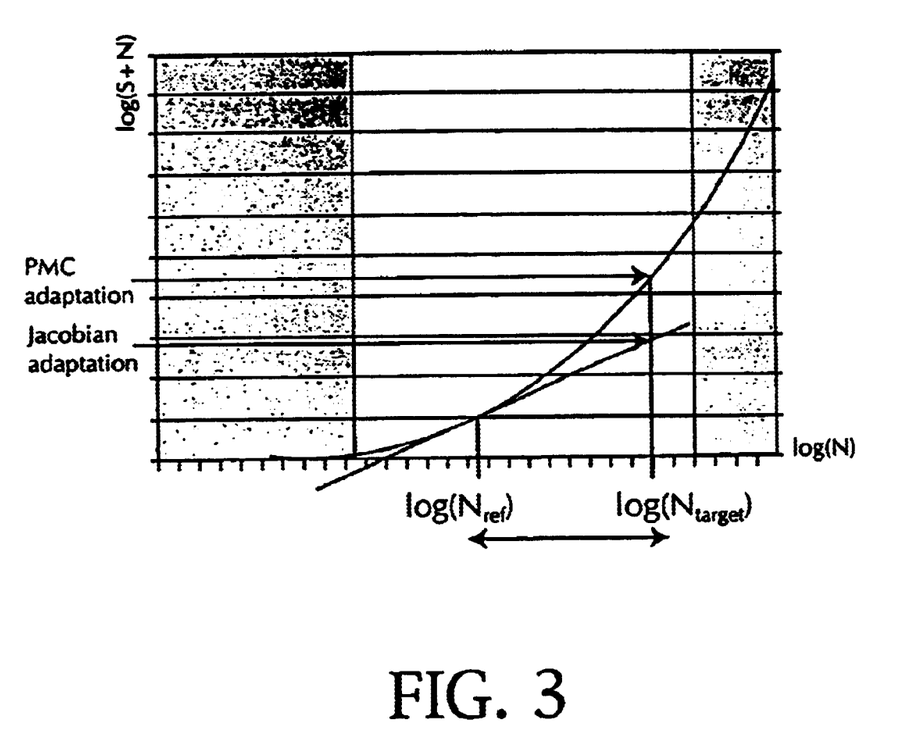
FIG. 3 is a log-spectral plot comparing conventional Jacobian Adaptation with Parallel Model Combination (PMC) adaptation.

The problem with the Jacobian adaptation approximation is that it holds only where the target noise (experienced during system use) is similar in quality to the reference noise (present during system training). The nature of the problem is illustrated in FIG. 3, which plots the evaluation, in the log-spectral domain, of the noisy speech parameters when the noise increases. Specifically, the plots show in the log-spectral domain how PMC adaptation and conventional Jacobian adaptation compare. In FIG. 3 the shaded region on the left corresponds to the condition where the speech signal is far more powerful than the noise, whereas the region on the right corresponds to conditions where the noise is more powerful than the speech signal. If both the training and testing environments are in the same of these two regions, then Jacobian Adaptation and PMC perform similarly. However, if one of these two environments is in the middle region, or if it is in another region than the other environment, then Jacobian Adaptation differs from PMC, and actually always underestimates the adaptation of the models.

We have discovered that the conventional Jacobian adaptation can be greatly improved through a linear or non-linear transformation of the Jacobian matrices. To effect the linear or non-linear transformation, the preferred embodiments employ a parameter that we call an α-adaptation parameter. Equation 3 below illustrates the presently preferred use of the α-adaptation parameter to effect a non-linear transformation. Equation 4 shows an alternate use of the parameter to effect a linear transformation. As noted above, while the use of an α-adaptation parameter to effect the transformation is presently preferred, other transformation techniques are also possible. For example a neural network or other artificial intelligence component may be used to transform Jacobian matrices for the initial noise condition. Another transformation technique involves applying a first α-adaptation parameter or factor to the input speech and a second α-adaptation parameter or factor to the noise. Other variations are also possible.

EQUATION 3

$$\Delta C(S+N) = F \cdot \frac{\alpha N}{S + \alpha N} \cdot F^{-1} \cdot \Delta C(N) \quad \text{EQUATION 3}$$

$$JA: \Delta C(S+N) = \frac{\partial C(S+N)}{\partial C(N)} \cdot \alpha \Delta C(N) \quad \text{EQUATION 4}$$

Referring to Equation 3, the α-adaptation parameter functions as follows. If the reference noise is close to zero, and if α is not too large, then both tangents (computed respectively at x-coordinate N and αN) are horizontal. If the reference noise is very important, then both tangents will correspond to the line y=x. If the reference noise belongs to the central region of FIG. 3, then the new slope of the tangent will be greater than the conventional Jacobian adaptation curve would have produced.

Use of the α-adaptation parameter in Equation 3 results in a non-linear transformation of the matrices. Both numerator and denominator are multiplied by the parameter, hence producing a non-linear transformative effect. In Equation 4 the α-adaptation parameter is multiplied against the resulting numerator/denominator quotient, hence producing a linear transformative effect.

In both cases, the main effect of the α-adaptation parameter is to increase the adaptation bias added to the speech models. This is useful because it corrects the shortcoming of conventional Jacobian adaptation to underestimate the effect of noise. In a later section of this document we present our experimental results, showing the improvements which are possible using the α-adaptation parameter.

Selection of the α-Adaptation Parameter

Theoretically, the optimal value of the α-adaptation parameter is dependent on the environment: the value for α should be greater where the mismatch between target noise and reference noise is greater. However, we have discovered that the α-adaptation parameter is far more stable than theory would have predicted. When used to generate Transformed Matrices as a replacement for conventional Jacobian adaptation, the variation in speech recognition accuracy is low for small values of α, increases for medium values of α and becomes low again when α increases beyond a certain point. This phenomenon is due to the shape of the curve in FIG. 3. Specifically, whatever the value of α is, the slope of the tangent will only vary between 0 and 1.

Figure 4:
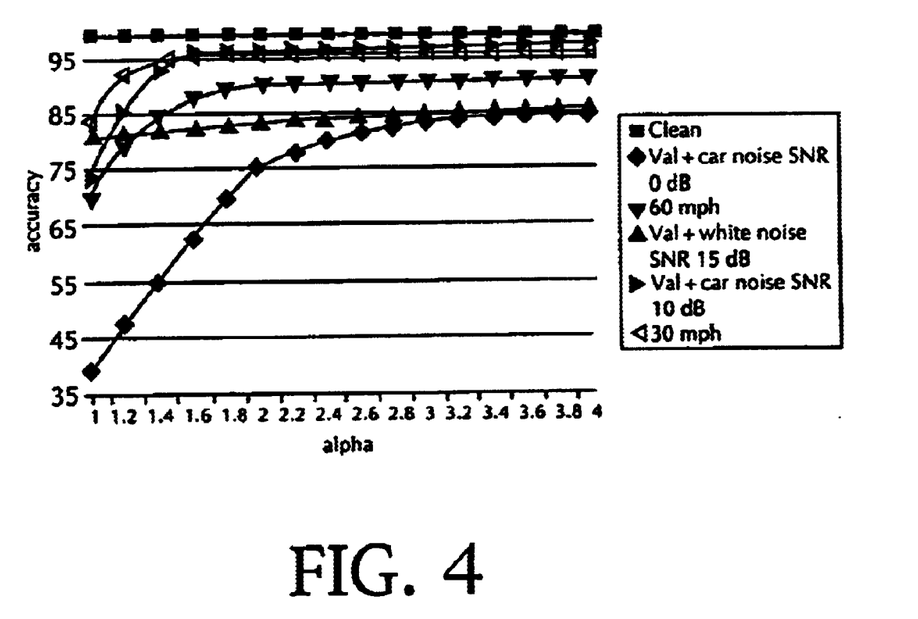
FIGS. 4 and 5 are α-adaptation parameter curves, showing the effect of different α values upon recognition accuracy.
Figure 5:
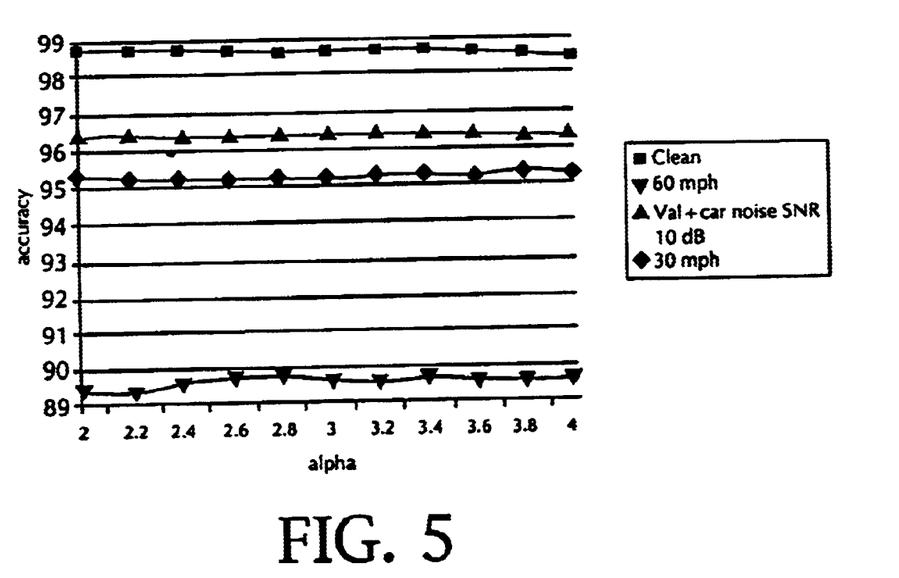

To clarify this point, we have realized a set of experiments for digits recognition in adverse environments. Twelve context-independent models of digits were constructed: the numbers from 1 to 9 plus models for "o" and "zero", plus a model for silence. The silence was modeled by a Hidden Markov Model (HMM) with five states. The remaining models used fifteen states. Each state of all the HMMs employs four Gaussian densities. The training set used to train the models comprised 3803 sequences of digits, pronounced by 80 speakers. The training set was recorded under laboratory conditions without noise. FIGS. 4 and 5 represent the variation of accuracy when α is varied in a range from 1 to 4. The data was generated based on six different acoustic environments:

The validation corpus, which is recorded in clean conditions.

The same corpus, with added car noise with a SNR of 10 dB.

The same corpus, with added car noise with a SNR of 0 dB.

The same corpus, with added white noise with a SNR of 15 dB.

The test corpus, recorded in a car at 30 mph.

Another test corpus, recorded in a car at 60 mph.

Referring to FIGS. 4 and 5, it can be seen that whatever the acoustic environment is, the variation of accuracy for different values of α is very low in the range of α=2.4 to α=3.6. This shows that α has a stable range that may be suitably exploited in a practical embodiment of the invention. While we presently prefer an α-adaptation parameter between about 2.4 to 3.6, it will be understood that this is merely representative of one possible stable range. In general, other values of α may be used with beneficial results. Stated differently, the decrease of accuracy between the true "optimal" value of α and any other value of a that may be chosen in a considered range (e.g. 2.4–3.6) is very low. Our data shows that the decrease in accuracy from the "optimal" point is less than three percent. This makes our improved Jacobian adaptation a very robust method.

Dimensionality Reduction for Reducing Computational Expense

As noted above, although Jacobian adaptation is less computationally expensive than PMC, it still places a fairly taxing burden on the recognition system, particularly for embedded systems.

Indeed, we have seen that each Tranformed Matrix can be expressed by the following Equation 5:

$$\frac{\partial C(S+N)}{\partial C(N)} \cdot = F \cdot \frac{S + \alpha N}{\alpha N} \cdot F^{-1} \qquad \text{EQUATION 5}$$

where $$\frac{S + \alpha N}{\alpha N}$$

is a diagonal matrix with dimensions NFiltXNFilt, where Nflit is the number of filters used in the spectral filter-bank.

Thus, each Transformed Matrix can be expressed as the weighted sum of Nfilt canonical matrices, which are in fact a base of the space to which Jacobian matrices belong. These canonical matrices are defined by:

$$J_i = F \cdot \text{diag}(i) \cdot F^{-1}$$

where diag(i) refers to a diagonal Nfilt x Nfilt matrix with 0 everywhere but 1 at position i.

Each Transformed Matrix can thus be expressed as:

$$\frac{\partial C(S+N)}{\partial C(N)} = \sum_{i=1}^{N_{filt}} \gamma_i \cdot J_i \qquad \text{EQUATION 6}$$

Thus, instead of storing Nd matrices (where Nd is the total number of densities in all the speech models), it is enough to store Nfilt canonical matrices, plus Nd times Nfilt coefficients $\gamma_i$. This considerably decreases the storage requirements.

However, this solution can be further improved because it increases the time-complexity of the algorithm: indeed, when all the Transformed Matrices are stored, Equation 2 can be applied directly to all the densities, which costs Nd matrix multiplication.

If the second solution is chosen, the right part of Equation 2 becomes:

$$\frac{\partial C(S+N)}{\partial C(N)} \cdot \Delta C(N) = \left( \sum_{i=1}^{N_{filt}} \gamma_i \cdot J_i \right) \cdot \Delta C(N) = \sum_{i=1}^{N_{filt}} \gamma_i \cdot (J_i \cdot \Delta C(N))$$

In this equation, the cost is Nfilt matrix additions, and Nfilt matrix multiplication by a scalar: this must be repeated for each density. The total cost is thus 2·Nd·Nfilt matrix operations.

If we do not want to use extra computational time, the number of canonical matrices has to be reduced.

The presently preferred technique to reduce the dimension of a space is to realize a Principal Component Analysis on the set of elements belonging to this space. We have thus first computed all the vectors $$\frac{S + \alpha N}{\alpha N}$$

and realized a single value decomposition on this set of vectors. The resulting canonical vectors have been used to compute the Nfilt canonical Jacobian matrices $$F \cdot \frac{S + \alpha N}{\alpha N} \cdot F^{-1}$$

sorted with descending order of their eigen-values.

Using principal component analysis, as described above, can yield considerable improvement in reducing computational burden. Experiments have shown that it is possible to reduce the number of useful canonical matrices down to five matrices. Even further reduction may be possible. Reducing the number of matrices decreases the space requirements as well as the computation time needed to perform the adaptation. To better understand the improvement achieved through dimensionality reduction (principal component analysis) Table I compares the Transformed Matrix adaptation process both with and without employing principal component analysis.

TABLE I

|  | dim. | alpha | Clean | 30 mph | 60 mph | Comp. time |
|---|---|---|---|---|---|---|
| Without PCA | 32 | 2 | 98.74% | 95.29% | 90.21% | 2439.28 us |
| With PCA | 7 | 2.4 | 98.56% | 95.70% | 90.63% | 1932.42 us |

In the above Table I the first column identifies the number of dimensions, that is the number of canonical matrices. The next column identifies the α-adaptation value used. The remaining columns give the percentage of recognition accuracy and the associated computation time required (cumulative time in, microseconds, of the adaptation over the whole database) for the following three environmental conditions: clean (no noise), vehicle at 30 miles per hour and vehicle at 60 miles per hour.

Experimental Results

The noise adaptation techniques described in the foregoing were tested under various noise conditions. The results of our tests are reproduced in this section. To test the adaptation system a speech recognizer for a car navigation system was employed. Of course, the adaptation techniques described herein are not restricted to car navigation or any other recognition task. Car navigation was selected for our tests because noise conditions within a moving vehicle can vary quite widely over different vehicle speeds. Thus a test of the adaptation system in a vehicular environment was selected as a good measure of the adaptation system's capabilities.

The experimental setup of these experiments is the same as previously described. Three testing sets were constructed: (1) comprising a validation set, composed of 462 sequences of digits pronounced by 20 speakers (different than in the training set), recorded in the same conditions as used in the training set; (2) composed of 947 sequences of digits pronounced by different speakers and recorded in a car at 30 miles per hour; (3) composed of 475 sequences of five digits pronounced by the same speakers, but recorded in the car at 60 miles per hour.

Recognition was performed using a simple loop grammar, with equal transition probabilities for all the numbers ("o" and "zero" models the same number) and silence. Accuracy was computed on ten numbers, after removing the silences in the recognized sentences.

For these first experiments, the signal was coded into a sequence of vectors of nine PLP coefficients (including the residual error) plus nine delta coefficients. Adaptation, if performed, was applied to only the means of the first nine static coefficients. For adaptation, the target noise was computed using 30 first frames of each sentence.

The results reproduced in Table II below, compare the performance of the Hidden Markov Models (HMM) without adaptation with the results obtained using parallel model combination (PMC) and traditional Jacobian adaptation (JA). Table II thus shows how both parallel model combination and Jacobian adaptation improve recognition performance in the presence of noise. Table II does not, however, show the performance of the improved Transformed Matrix adaptation using α-adaptation. This table is presented to serve as a baseline against which the improved Transformed Matrix adaptation technique may be better understood.

TABLE II

| system | Clean validation | 30 mph | 60 mph |
|---|---|---|---|
| HMM (no adaptation) | 98.84% | 56.27% | 35.83% |
| PMC | 95.78% | 91.72% | 89.60% |
| JA | 98.66% | 83.76% | 70.02% |

TABLE III

| Adaptation | alpha | clean | 30 mph | 60 mph |
|---|---|---|---|---|
| No | | 98.84% | 56.27% | 35.83% |
| PMC | | 95.78% | 91.72% | 89.60% |
| JA | | 98.66% | 83.76% | 70.02% |
| α-PMC | 1.3 | 96.03% | 91.67% | 89.81% |
| α-TM | 3 | 98.73% | 95.24% | 89.81% |

Table III shows the comparative performance of both parallel model combination and Jacobian adaptation, with and without the alpha factor. In Table III the Transformed Matrix adaptation with α-adaptation is designated "α-TM." For comparison purposes, the alpha factor was also applied in the parallel model combination technique as shown in the row designated "α-PMC."

Comparing the results in Table III, note that the improved Transformed Matrix adaptation (α-TM) performs significantly better than standard Jacobian adaptation (JA) in the presence of noise. While the alpha factor did not substantially degrade the performance of PMC adaptation, it did not provide significant improvement either.

The results of our experiments show that the improved Transformed Matrix adaptation technique, employing the α-adaptation factor, gives considerably better results that standard Jacobian adaptation. Moreover, because Transformed Matrix adaptation is inherently less computationally expensive than PMC, it becomes an ideal candidate for embedded recognition systems that do not have a lot of processing power or memory. Such applications include, for example, cellular telephone recognition systems and vehicular navigation systems and other consumer products.

In addition, still further improvements in system performance can be had through use of the dimensionality reduction techniques described herein. When combined with Transformed Matrix adaptation, the result is a compact, efficient and robust adaptation system that will serve well in many recognition applications.

Further Embodiments

It will be appreciated that while the above discussion demonstrates the advantages of α-Jacobian adaptation for additive noise, similar advantages can be achieved with respect to convolutional noise. At the outset, it is important to note that in practice, all speech signals are corrupted, not only by additive noise, but also by convolutional (or channel) noise. The classical equation that represents the resulting signal, in the spectral domain, is the following:

$$S' = HS + N$$

where S is the spoken speech, S' is the resulting signal, H is the channel noise and N is the additive noise. Written in the cepstral domain, this equation becomes:

$$C(S') = C(HS + N)$$

Let us define $H_{tar}$ and $N_{tar}$ as the target convolutional and additive noises (i.e., estimated at testing time), and $H_{ref}$ and $N_{ref}$ the reference convolutional and additive noises (i.e., estimated at training time). Then, we can compute:

$$C(H_{tar}S + N_{tar}) = C\left(\frac{H_{tar}}{H_{ref}}\left(H_{ref}S + \frac{H_{ref}}{H_{tar}}N_{tar}\right)\right)$$

$$C(H_{tar}S + N_{tar}) = C\left(\frac{H_{tar}}{H_{ref}}\right) + C\left(H_{ref}S + \frac{H_{ref}}{H_{tar}}N_{tar}\right)$$

Jacobian approximation (or α-Jacobian approximation) can then be applied to the second term of the sum:

$$C\left(H_{ref}S + \frac{H_{ref}}{H_{tar}}N_{tar}\right) =$$

$$C(H_{ref}S + N_{ref}) + \frac{\partial C(H_{ref}S + N_{ref})}{\partial C(N_{ref})}\left(C\left(\frac{H_{ref}}{H_{tar}}N_{tar}\right) - C(N_{ref})\right)$$

$$C\left(H_{ref}S + \frac{H_{ref}}{H_{tar}}N_{tar}\right) =$$

$$C(H_{ref}S + N_{ref}) + J_c(C(N_{tar}) - C(N_{ref})) - J_c(C(H_{tar}) - C(H_{ref}))$$

where $$J_c = \frac{\partial C(H_{ref}S + N_{ref})}{\partial C(N_{ref})}$$

denotes the Noise adaptation matrix of speech vector S. Thus, $$C(H_{tar}S + N_{tar}) = (1 - J_c)(C(H_{tar}) - C(H_{ref})) + C(H_{ref}S + N_{ref}) + J_c(C(N_{tar}) - C(N_{ref}))$$
EQUATION 7

The first term $(1 - J_c)(C(H_{tar}) - C(H_{ref}))$ represents the convolutional bias $(C(H_{tar}) - C(H_{ref}))$ transformed by a channel adaptation matrix $(1 - J_c)$. It is important to note that the transformation is of the convolutional bias as represented in the cepstral domain. The third term $J_c(C(N_{tar}) - C(N_{ref}))$ represents the additive bias transformed by a noise adaptation matrix $J_c$. The second term $C(H_{ref}S+N_{ref})$ represents a model of the reference signal in the cepstral domain.

Figure 6:
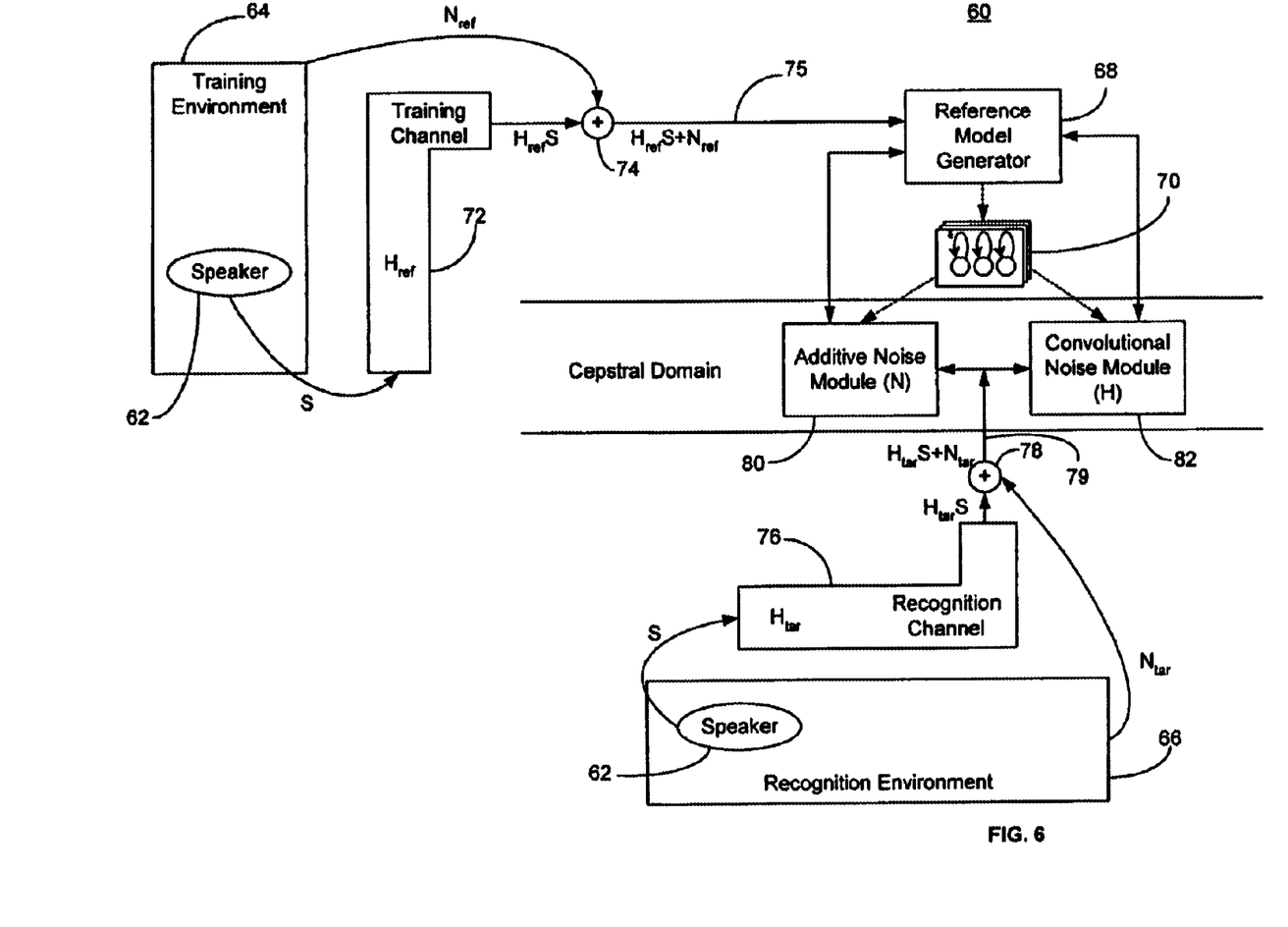
FIG. 6 is a block diagram of a noise adaptation system in accordance with the present invention.

Turning now to FIG. 6, a noise adaptation system 60 capable of performing noise adaptation in a speech recognition system (not shown) is shown. Generally, the noise adaptation system 60 uses a training speech signal 75 resulting from a speaker 62 in a training environment 64, and a target speech signal 79 resulting from the speaker 62 in a recognition environment 66. The training speech signal 75 is shown as having a convolutional noise component $H_{ref}$ resulting from training channel 72, and an additive noise component $N_{ref}$ as incorporated at summer 74. Similarly, the target noise signal 79 has a convolutional noise component $H_{tar}$ resulting from recognition channel 76 and an additive noise component $N_{tar}$ as incorporated at summer 78.

The channels 72, 76 will typically incorporate various signal processing devices such as microphones, telephone lines, etc. the difficulty with noise adaptation arises when the recognition channel 76 has different characteristics from the training channel 72. In such cases, the target convolutional noise component $H_{tar}$ will differ from the reference convolutional noise component $H_{ref}$. A primary goal of the present invention is to adapt the reference model to account for such convolutional bias.

The adaptation system 60 has a reference model generator 68, an additive noise module 80, and a convolutional noise module 82. The reference model generator 68 generates a reference model 70 based on the training speech signal 75. The reference model 70 can be an HMM, a Gaussian Mixture Model (GMM), or any other speech model which is trainable for the purposes of the present invention. It can be seen that the additive noise module 80 is coupled to the reference model generator 68, and compensates the reference model 70 for additive noise in the cepstral domain. The convolutional noise module 82 is coupled to the reference model generator 68 and compensates the reference model 70 for convolutional noise in the cepstral domain.

Although equation 7 describes how to adapt the models for both additive and channel noise, an estimation of $C(H_{tar})-C(H_{ref})$ is needed. Such an estimation is usually computed by averaging the difference between the cepstral vectors of the target and reference speech signals 79, 75. This estimation is also used in the well-known Cepstral Mean Subtraction (CMS) algorithm discussed in M. Westphal, "The use of cepstral means in conversational speech recognition", EUROSPEECH '97, Rhode, Greece, 1997. We will hereafter refer to the compensation algorithm defined in Equation 7, by the term "Cepstral Mean Adaptation", or CMA. Actually, CMA is very similar to CMS, in the sense that it also tries to make the averages of the reference and of the test signals match. Nevertheless, there are several differences between these methods:

- CMS is applied on the signal itself, whereas CMA is applied to the models;
- CMS is applied on both the reference and target signals, whereas CMA is applied only to the reference models;
- CMS only compensates for the convolutional noise whereas CMA takes into account both additive and channel noise.

Figure 7:
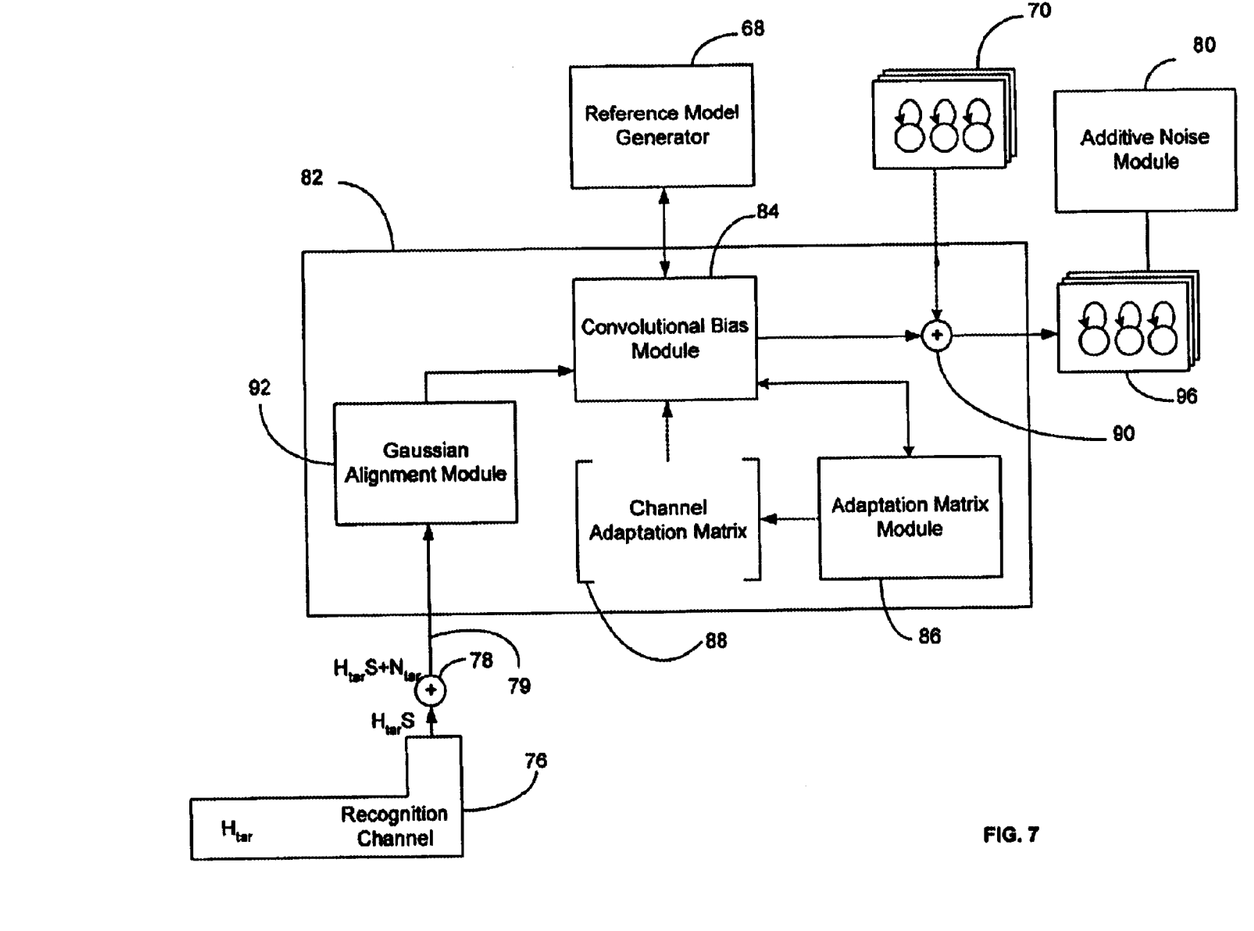
FIG. 7 is a block diagram of a convolutional noise module in accordance with one embodiment of the present invention.

Turning now to FIG. 7, one approach to compensating the reference model for convolutional noise in the cepstral domain (as part of the joint compensation) is shown. Thus, the convolutional module 82 provides an estimation of the convolutional bias and adapts the reference model with this estimation. The result is a convolutionally adapted model 96. The convolutionally adapted model 96 can then be operated upon by the additive noise module 80 to fully compensate the reference model 70 for both additive and convolutional noise. Specifically, one embodiment of the convolutional noise module 82 includes a convolutional bias module 84 for estimating the convolutional bias between the reference model 70 and the target speech signal 79. An adaptation matrix module 86 generates a channel adaptation matrix 88 based on the training speech signal. The channel adaptation matrix 88 is essentially a modified noise adaptation matrix $1-J_c$. It is important to note that $J_c$ can either be a standard Jacobian matrix or an $\alpha$-Jacobian matrix as described above. The convolutional bias module 84 transforms the estimated convolutional bias with the channel adaptation matrix 88. The convolutional noise module 82 further includes a summation module 90 coupled to the convolutional bias module 84 for adding the transformed convolutional bias to the reference model 70 in the cepstral domain.

Computation of the Convolutional Bias

In order to estimate the convolutional bias, let us assume that the Gaussian alignment between the reference models and the signal is known. We describe two possible approaches to compute the convolutional bias, based on this assumption:

I. First Approach

If we assume that $H_{tar}S >> N_{tar}$, then it is possible to average the segments of the signal corresponding to speech units, in order to obtain:

$$\hat{C}(S_{tar}) = \frac{1}{T}\sum_{t=1}^{T}(C(H_{tar} \cdot S_t)) = C(H_{tar}) + \frac{1}{T}\sum_{t=1}^{T}C(S_t)$$

Similarly, it should be possible to compute the term $\hat{C}(S_{ref})$ by averaging the same reference, i.e., clean, signal. However, this signal is generally not available, as only the noisy (target) signal is known. We then have to estimate this reference signal. Such an estimate may be obtained with the use of a Gaussian alignment between the models and the signal. Therefore, for each frame, the Gaussian density aligned with the target frame $C(H_{tar}St)$ represents the corresponding reference frame $C(H_{ref}St)$. It is then possible to compute:

$$\hat{C}(S_{ref}) = \frac{1}{T}\sum_{t=1}^{T}(C(H_{ref} \cdot S_t)) = C(H_{ref}) + \frac{1}{T}\sum_{t=1}^{T}C(S_t)$$

By subtracting the two previous equations, we obtain:

$$C(H_{tar})-C(H_{ref}) = \hat{C}(S_{tar})-\hat{C}(S_{ref}) \quad \text{EQUATION 8}$$

In practice, to compute the channel bias as indicated by the above equation, we need the Gaussian alignment of the current sentence, as given by the recognizer. In order to avoid using a two-pass recognition system, we have decided to adapt the current sentence with the adaptive bias computed on the previous one. This makes the system more sensitive to a change of the environment, as for example when a different speaker pronounces the previous and the current sentence. However, the advantage of this approximation is that the adaptation is still very fast and only requires a single recognition pass.

Thus, the convolutional noise module 82 can further include a Gaussian alignment module 92 for segmenting the target speech signal into target speech segments and target silence segments. While the segmentation function is typically included within the speech recognizer, it is described here as part of the convolutional noise module 82 for purposes of discussion. In fact, the particular location of many of the components described herein may vary without parting from the nature and scope of the invention. The convolutional bias module 84 therefore averages the target speech signals and Gaussian data corresponding to the reference model 70. The convolutional bias module 84 further calculates a difference between the average for the Gaussian data and the average for the target speech segments. The result is a convolutional bias $C(H_{tar})-C(H_{ref})$ than can be added to the reference model 70 in the cepstral domain after transformation by the channel adaptation matrix.

II. Second Approach

A preferred incremental solution to estimating the convolutional bias allows us to take into account the target noise $N_{tar}$. This method makes use of a previous estimate of the convolutional bias (computed, for example, on the previous sentence), and improves this estimate by using the signal of the current sentence. The convolutional bias is therefore estimated incrementally, from one sentence to the next one, and is likely to improve so long as the speaker or the environment does not change.

Averaging the signal of the speech segments of the current sentence leads us to:

$$\hat{C}(S_{tar}) = \frac{1}{T}\sum_{t=1}^{T}(C(H_{tar} \cdot S_t + N_{tar})) =$$

$$\frac{1}{T}\sum_{t=1}^{T}\left(C(H_{tar}) + C\left(S_t + \frac{N_{tar}}{H_{tar}}\right)\right) = C(H_{tar}) + \frac{1}{T}\sum_{t=1}^{T}C\left(S_t + \frac{N_{tar}}{H_{tar}}\right)$$

On the previous sentence, the adapted models $$C\left(H_{ref}S + \frac{H_{ref}}{H_{tar}}N_{tar}\right)$$

have already been estimated. It is then possible to compute the average of the reference frames using this set of models:

$$C(H_{ref}) + \frac{1}{T}\sum_{t=1}^{T}C\left(S_t + \frac{N_{tar}}{H_{tar}}\right)$$

$$\hat{C}(S_{ref}) = \frac{1}{T}\sum_{t=1}^{T}\left(C\left(H_{ref} \cdot S_t + \frac{H_{ref}}{H_{tar}}N_{tar}\right)\right) = \frac{1}{T}\sum_{t=1}^{T}(C(H_{ref}) +$$

$$C\left(S_t + \frac{N_{tar}}{H_{tar}}\right)) =$$

Subtracting the two previous equations gives us the channel bias represented by Equation 8. With this method, we have to assume that the target and reference channels of the first sentence are identical.

EXPERIMENTAL RESULTS

Figure 8:
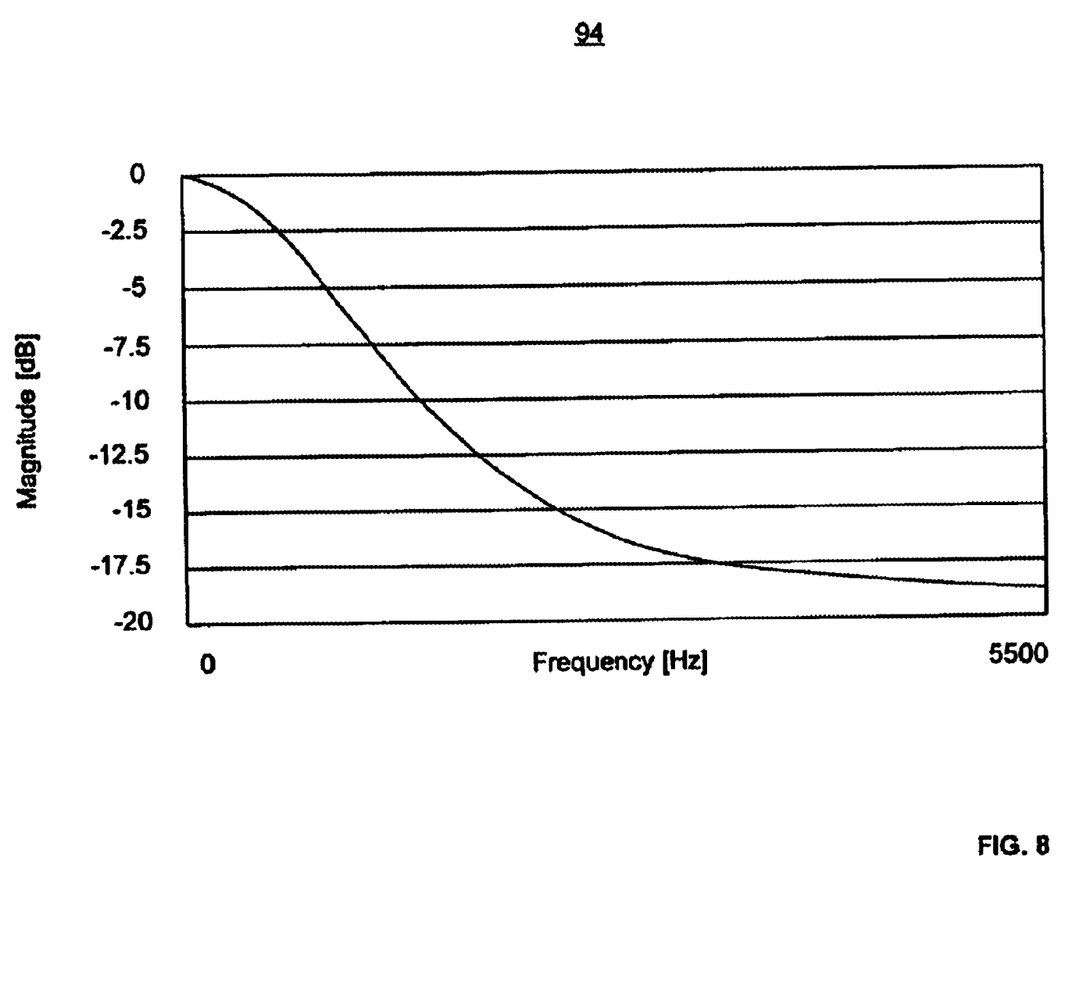
FIG. 8 is a plot of a filter used to simulate the effect of a convolutional noise in accordance with the present invention.

Turning now to FIG. 8, the shape of the filter used to simulate the effect of a convolutional noise is shown for the purposes of experimentation at plot 94. The above-described second approach was chosen for the following simulations.

Table 4 demonstrates the results of the present invention, when both additive and channel noise adaptation are used.

TABLE IV

| System | Accuracy |
| --- | --- |
| No compensation at all | 30.5% |
| Additive noise compensation alone | 76.2% |
| Additive and convolutional noise compensation | 92.7% |
| Reference results: | |
| Additive noise compensation on the initial signal (no filter) | 94.5% |

The result given in the last line of Table 4 is the accuracy of the present invention without any channel compensation method, on the initial database (no convolutional noise compensation). This accuracy is thus the upper-limit that may be reached, when using an "ideal" channel compensation method. Results show that our system is not very far from this best achievable accuracy, which validates the approximations that have been realized during the development of this method.

It is important to note that the above joint compensation approach enjoys many of the benefits associated with α-Jacobian Adaptation described for additive noise compensation alone. As already discussed, α-Jacobian Adaptation finds its roots in the Jacobian Adaptation algorithm. α-Jacobian Adaptation differs from Jacobian Adaptation in the way the approximation is realized: the latter makes use of the linear function that best approximates PMC in the training conditions, whereas the former experimentally computes a linear function that better approximates PMC for a selected set of possible testing conditions. As a result, α-Jacobian Adaptation performs better than classical Jacobian Adaptation for real testing conditions.

We have then decreased by more than a half the time and memory complexity of this algorithm by reducing, with the use of Principal Component Analysis, the number of required transformation matrices, without degrading the recognition results.

While the invention has been described in its presently preferred embodiments, it will be understood that the invention is capable of modification without departing from the spirit of the invention as set forth in the appended claims.

What is claimed is:

1. A method for performing noise adaptation in a speech recognition system, the method comprising the steps of:
    generating a reference model based on a training speech signal;
    compensating the reference model for additive noise in a cepstral domain;
    compensating the reference model for convolutional noise in the cepstral domain;
    estimating a convolution bias between the reference model and a target speech signal;
    transforming the estimated convolutional bias with a channel adaptation matrix;
    adding the transformed convolutional bias to the reference model in the cepstral domain; and
    multiplying the estimated convolutional bias by a modified channel adaptation matrix.

2. The method of claim 1 further including the steps of:
    averaging Gaussian data corresponding to the reference model;
    averaging target speech segments corresponding to the target speech signal; and calculating a difference between the average for the Gaussian data and the average for the target speech segments.

3. The method of claim 2 further including the step of adapting each sentence of the training speech signal with data from a preceding sentence.

4. The method of claim 1 wherein the channel adaptation matrix is given by an adaptation equation, the adaptation equation given by $1-J_c$, where $J_c$ is a noise adaptation matrix.

5. The method of claim 1 wherein the adaptation matrix is given by an adaptation equation, the adaptation equation given by $$J_c = \frac{\partial C(H_{ref}S + N_{ref})}{\partial C(N_{ref})},$$

where C represents the cepstral domain, $H_{ref}$ represents convolutional noise in the training speech signal, S represents the speech vector, and $N_{ref}$ represents additive noise in the training speech signal.

6. The method of claim 1 further including the steps of:
estimating an additive bias between the training speech signal and a target speech signal;
transforming the estimated additive bias with a noise adaptation matrix; and
adding the transformed additive bias to the reference model in the cepstral domain.

7. A method for compensating a reference model of a training speech signal base for convolutional noise in a cepstral domain, the method including the steps of:
estimating a convolutional bias between the training speech signal and a target speech signal;
transforming the estimated convolutional bias with a channel adaptation matrix;
adding the transformed convolutional bias to the reference model in the cepstral domain; and
multiplying the estimated convolutional bias by a modified channel adaptation matrix.

8. The method of claim 7 further including the steps of:
averaging training speech segments corresponding to the training speech signal;
averaging target speech segments corresponding to the target speech signal; and
calculating a difference between the average for the training speech segments and the average for the target speech segments.

9. The method of claim 8 further including the step of adapting each sentence of the training speech signal with data from a preceding sentence.

10. The method of claim 7 wherein the channel adaptation matrix is given by an adaptation equation, the adaptation equation given by $1-J_c$, where $J_c$ is a noise adaptation matrix.

11. The method of claim 7 wherein the noise adaptation matrix is given by an adaptation equation, the adaptation equation given by $$J_c = \frac{\partial C(H_{ref}S + N_{ref})}{\partial C(N_{ref})},$$

where C represents the cepstral domain, $H_{ref}$ represents convolutional noise in the training speech signal, S represents the speech vector, and $N_{ref}$ represents additive noise in the training speech signal.

12. A noise adaptation system for a speech recognition system, the adaptation system comprising:
a reference model generator for generating a reference model based on a training speech signal;
an additive noise module coupled to the reference model generator, the additive noise module compensating the reference model for additive noise in a cepstral domain;
a convolutional noise module coupled to the reference model generator, the convolutional noise module compensating the reference model for convolutional noise in the cepstral domain;
a convolutional bias module for estimating a convolutional bias between the reference model and a target speech signal;
an adaptation matrix module for generating a channel adaptation matrix based on the training speech signal, the convolutional bias module transforming the estimated convolutional bias with the channel adaptation matrix; and
a summation module coupled to the convolutional bias module for adding the transformed convolutional bias to the reference model in the cepstral domain;
wherein the convolutional bias module multiplies the estimated convolutional bias by a modified channel adaptation matrix.

13. The noise adaptation system of claim 12 wherein the convolutional noise module further includes:
a Gaussian alignment module for segmenting the target speech signal into target speech segments and target silence segments;
said convolutional bias module averaging the target speech segments and Gaussian data corresponding to the reference model, the convolutional bias module further calculating a difference between the average for the Gaussian data and the average for the target speech segments.

* * * * *